US012743930B2

(12) United States Patent
Polena

(10) Patent No.: US 12,743,930 B2
(45) Date of Patent: Sep. 22, 2026

(54) GAMING SYSTEM AND METHOD WITH DYNAMIC JACKPOT SORTING

(71) Applicant: LNW Gaming, Inc., Las Vegas, NV (US)

(72) Inventor: Mariela Polena, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 366 days.

(21) Appl. No.: 18/635,444

(22) Filed: Apr. 15, 2024

(65) Prior Publication Data

US 2024/0428654 A1 Dec. 26, 2024

Related U.S. Application Data

(60) Provisional application No. 63/509,360, filed on Jun. 21, 2023.

(51) Int. Cl.
*G07F 17/32* (2006.01)

(52) U.S. Cl.
CPC ...... *G07F 17/3258* (2013.01); *G07F 17/3213* (2013.01); *G07F 17/3267* (2013.01)

(58) Field of Classification Search
CPC ............. G07F 17/3258; G07F 17/3213; G07F 17/3267
See application file for complete search history.

(56) References Cited

U.S. PATENT DOCUMENTS

| | | | | |
|---|---|---|---|---|
| 11,024,121 | B2 * | 6/2021 | Trivedi | G07F 17/3258 |
| 11,107,314 | B2 * | 8/2021 | Tam | G07F 17/3213 |
| 11,893,862 | B2 | 2/2024 | Bouvier et al. | |
| 2015/0011307 | A1 * | 1/2015 | Englman | G07F 17/3258 463/27 |
| 2016/0232752 | A1 * | 8/2016 | Korthauer | G07F 17/3258 |
| 2021/0295652 | A1 * | 9/2021 | O'Hara | G07F 17/3288 |
| 2022/0277621 | A1 * | 9/2022 | O'Hara | G07F 17/3262 |

OTHER PUBLICATIONS

Quick Hit Blitz Red, New York Lottery, v.1, Feb. 2022.
Quick Hit Blitz Blue, New York Lottery, v. 1, Feb. 2022.
Quick Hit Super Wheel Triple Blazing 7s, HHR Stepper, KY v.1, Oct. 2021.
Quick Hit Blitz Gold, C3, v.2, Apr. 2022.

* cited by examiner

*Primary Examiner* — Ankit B Doshi

(57) ABSTRACT

There is provided a gaming system, gaming machine, and method that utilize a presentation assembly configured to present a plurality of symbol-bearing reels, an array, and a jackpot ladder. The ladder includes a plurality of levels bearing scalable jackpots and a progressive jackpot. Game-logic circuitry scales the scalable jackpots, but not the progressive jackpot, according to an amount of a wager to play a wagering game on the machine. If the jackpots would not be in descending order in the ladder after the scaling, the game-logic circuitry sorts the jackpots into descending order by shifting the progressive jackpot from its current level to a different level and entering a scaled jackpot at the current level vacated by the progressive jackpot. In response to a triggering event resulting from one or more spins of the reels, a jackpot in the sorted ladder may be won.

20 Claims, 4 Drawing Sheets

GAMING SYSTEM AND METHOD WITH DYNAMIC JACKPOT SORTING

RELATED APPLICATIONS

This patent application claims the benefit of U.S. Provisional Patent Application No. 63/509,360 filed Jun. 21, 2023, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to a dynamic jackpot sorting feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize a presentation assembly configured to present a plurality of symbol-bearing reels, an array, and a jackpot ladder. The ladder includes a plurality of levels bearing scalable jackpots and a progressive jackpot. Game-logic circuitry scales the scalable jackpots, but not the progressive jackpot, according to an amount of a wager to play a wagering game on the machine. If the jackpots would not be in descending order in the ladder after the scaling, the game-logic circuitry sorts the jackpots into descending order by shifting the progressive jackpot from its current level to a different level and entering a scaled jackpot at the current level vacated by the progressive jackpot. In response to a triggering event resulting from one or more spins of the reels, a jackpot in the sorted ladder may be won.

Additional aspects of the invention will be apparent to those of ordinary skill in the art in view of the detailed description of various embodiments, which is made with reference to the drawings, a brief description of which is provided below.

Figure 1:
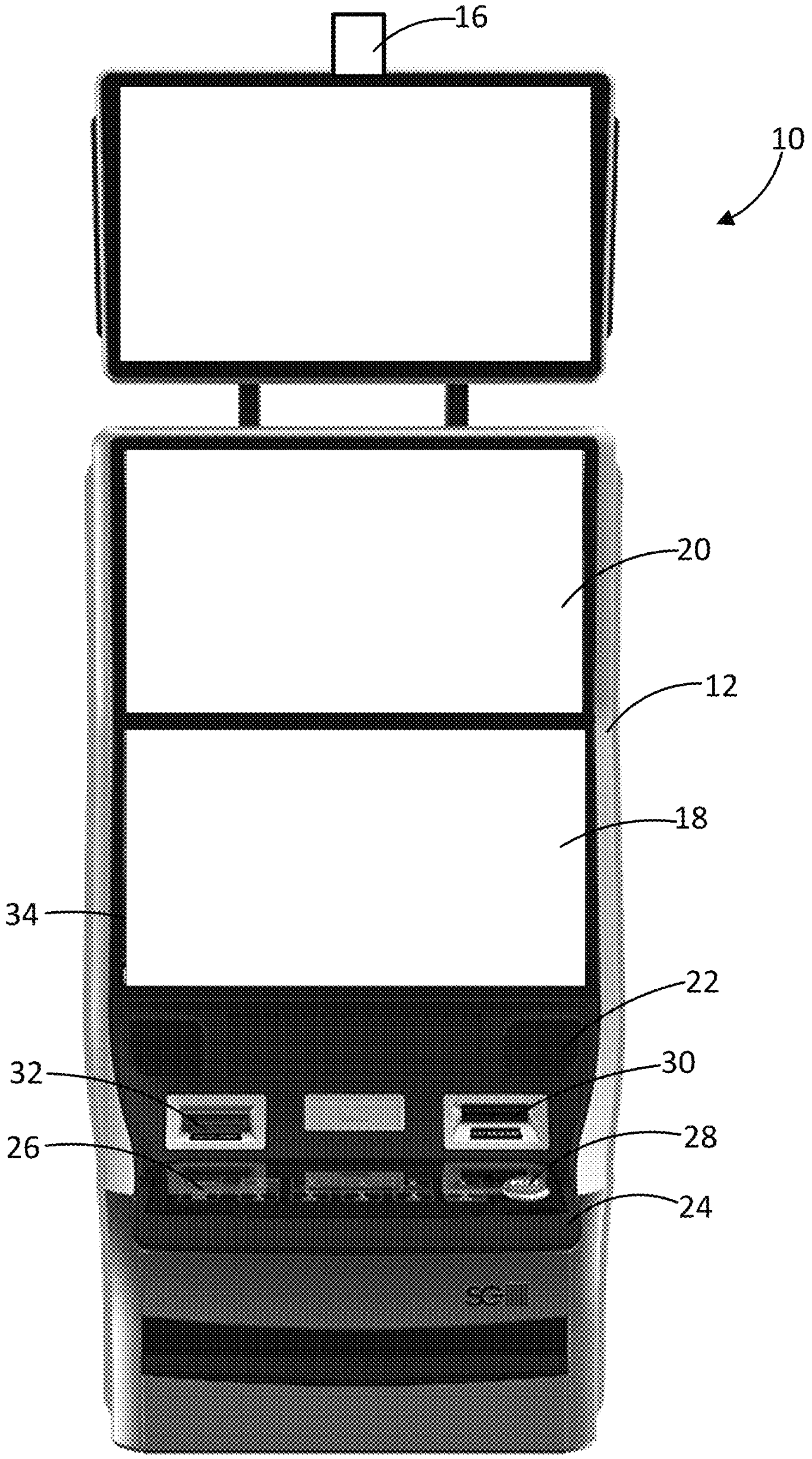
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) mounted over the primary or secondary presentation devices, an input deck 24 supporting a video button panel 26 bearing touch keys and one or more mechanical push-buttons 28, a bill/ticket acceptor 30, a card reader/writer (not shown), a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, video button panel 26, push-buttons 28, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credit" meter 200 (see FIGS. 4-7). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 30, a card reader/writer (not shown), a wireless communication interface for reading cash or credit data from a nearby mobile device, and a network interface for withdrawing cash or credits from a remote account via an electronic funds transfer. In response to a cashout input that initiates a payout from the credit balance on the "credit" meter 34, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, a card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
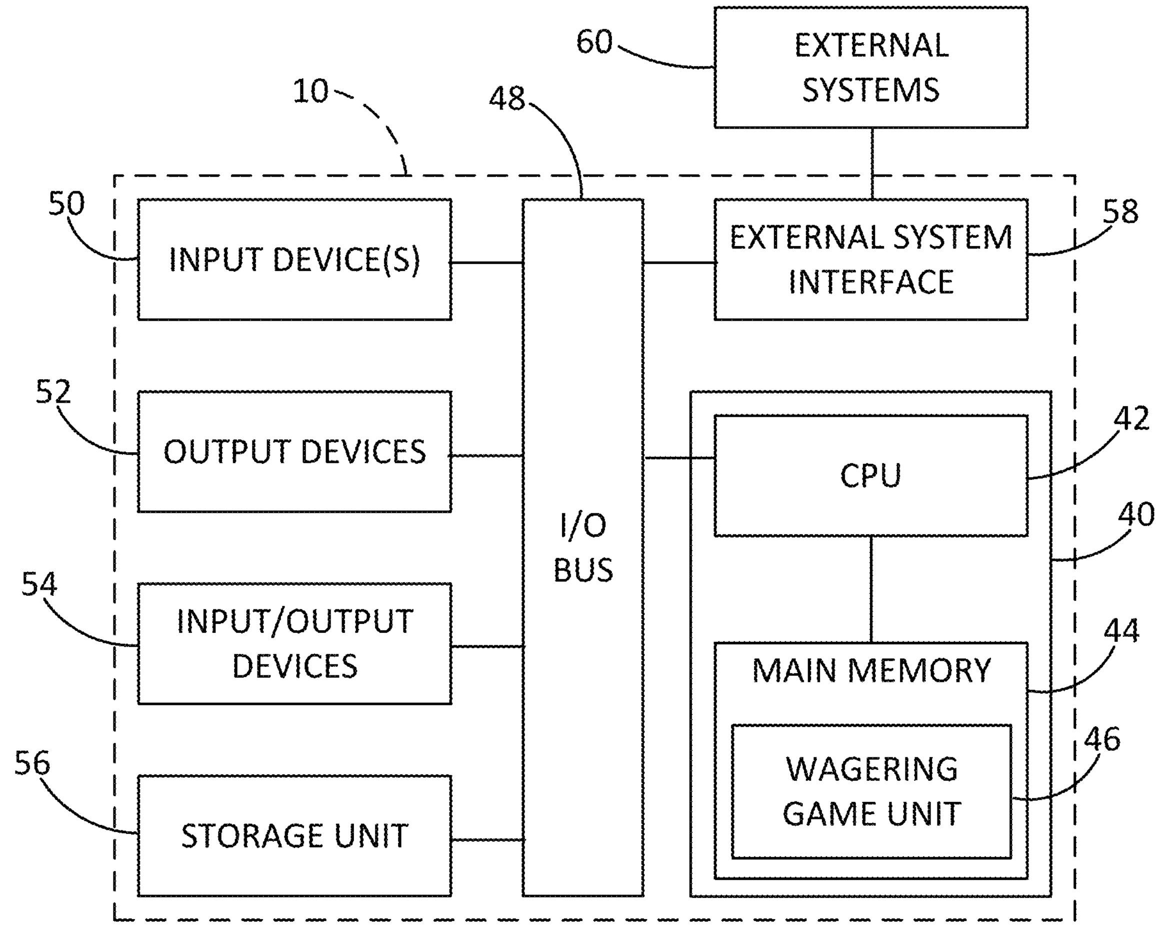
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
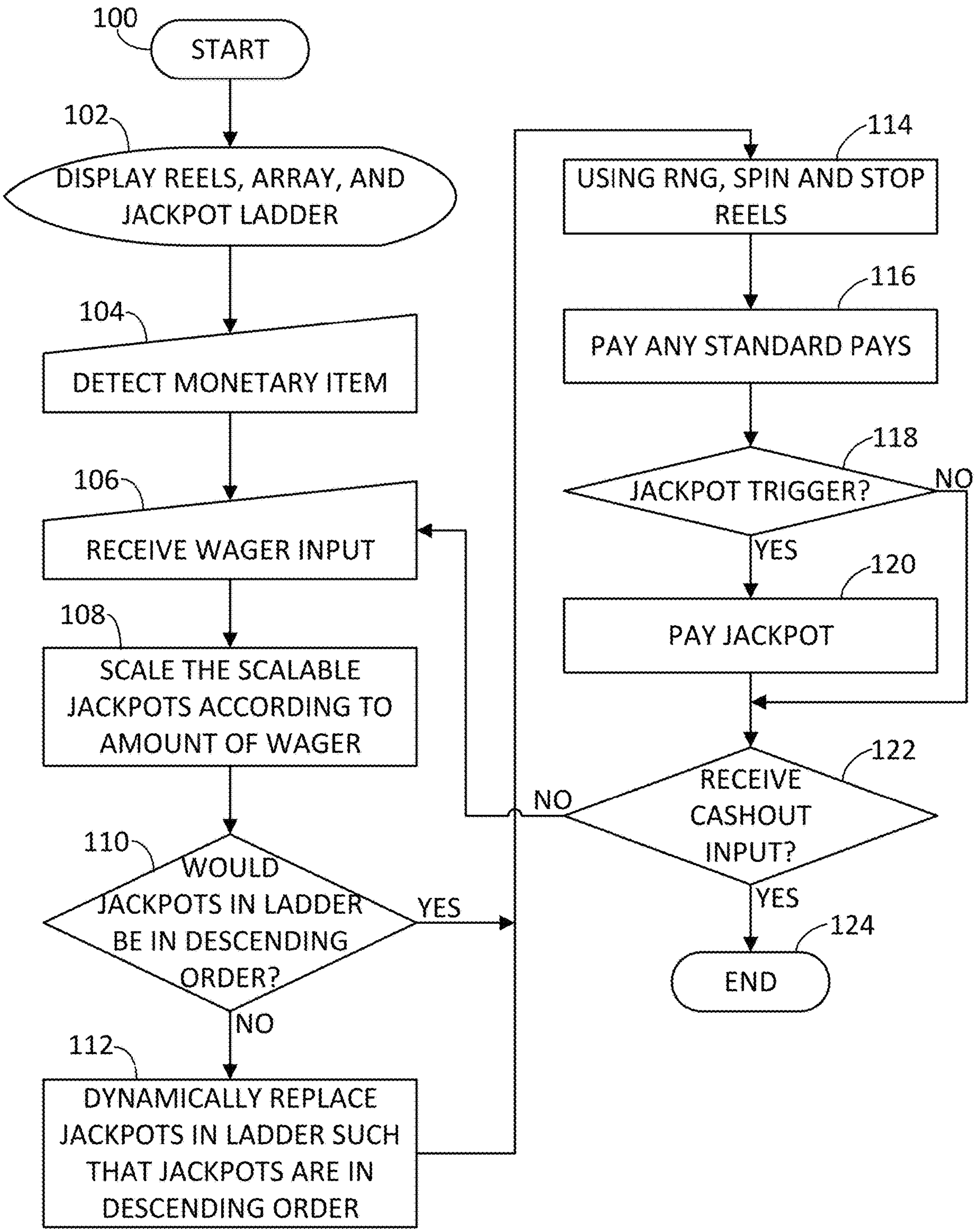
FIG. 3 is a flow diagram for a data processing method that corresponds to instructions executed by a controller, according to an embodiment of the present invention.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of spin outcomes in FIGS. 4-7.

The data processing method commences at step 100. At step 102, the game-logic circuitry controls one or more presentation devices (e.g., mechanical-reel display device, video display device, or a combination thereof) that presents a plurality of symbol-bearing reels, an array of symbol positions, and a jackpot ladder. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position.

In the example shown in FIGS. 4-7, the presentation device presents a three-by-five array 206 comprising three rows and five columns. The reels bear a plurality of symbols. In one embodiment, the plurality of symbols include standard symbols 9, 10, J, Q, K, and A and a special jackpot symbol QH. The presentation device also presents a jackpot ladder 208 comprising a plurality of levels, such as the six levels labelled 5QH, 6QH, 7QH, 8QH, 9QH, and 10QH. The plurality of levels including a top level (e.g., 10QH) and a bottom level (e.g., 5 QH). The plurality of levels bear respective jackpots of a plurality of jackpots. The plurality of jackpots include a first set of scalable jackpots and a second set of at least one progressive jackpot. The progressive jackpot increments (increases or progresses) each time the wagering game is played but the jackpot is not won. When the progressive jackpot is won, the jackpot for the next play is reset to a predetermined value (e.g., $500) and resumes increasing under the same rule. For example, each wagered dollar ($1.00) may increment the progressive jackpot by three cents ($0.03), i.e., each wagered dollar contributes three cents to the progressive jackpot. The progressive jackpot may be linked to a single gaming machine (such that only wagers on that machine contribute to the jackpot) or to multiple gaming machines (such that wagers on all the machines contribute to the jackpot). In contrast, the scalable jackpots do not increment each time the wagering game is played.

Figure 4:
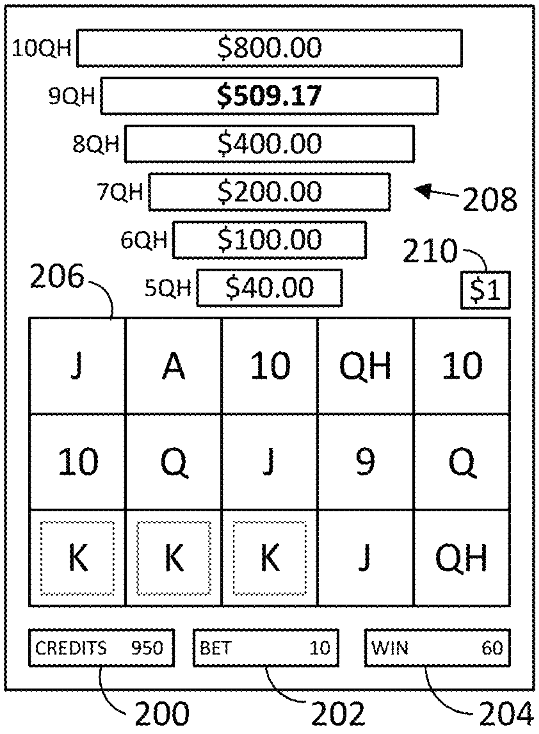
FIGS. 4-7 illustrate examples of displayed spin outcomes resulting from the flow diagram in FIG. 3.
Figure 5:
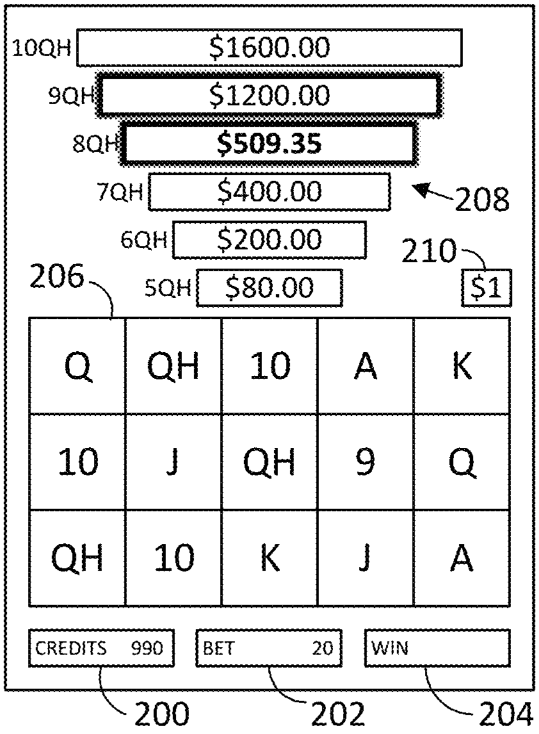
Figure 6:
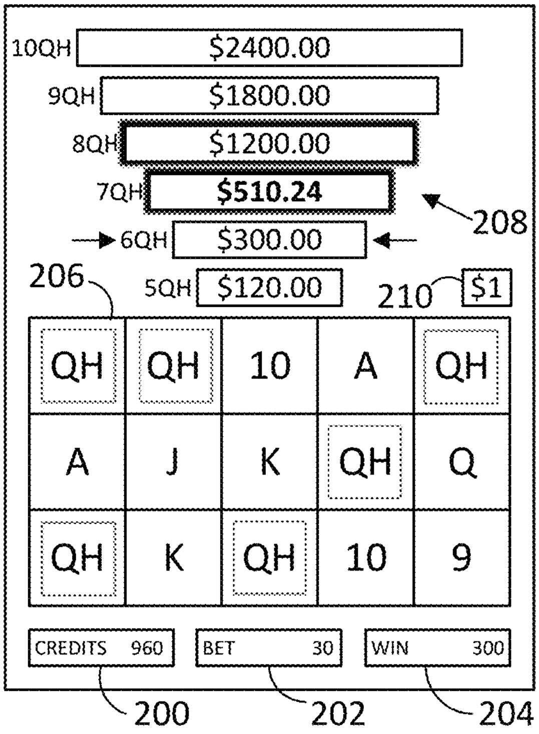
Figure 7:
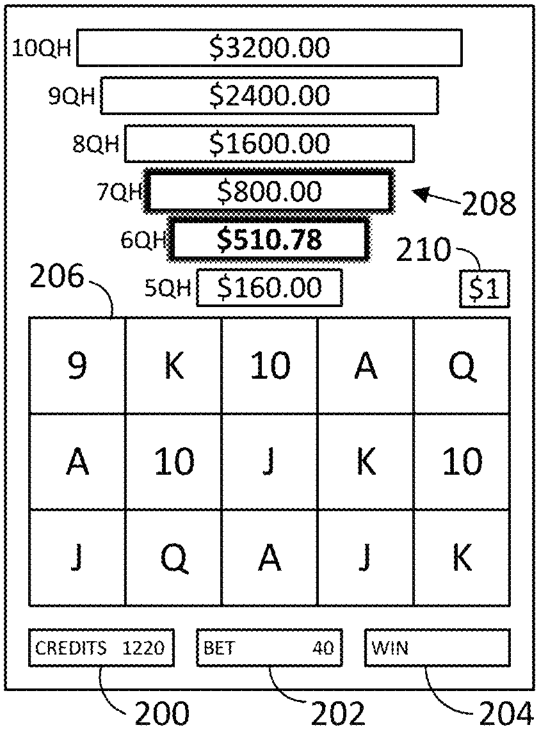

In FIG. 4, the scalable jackpots are $40.00 at the 5QH level, $100.00 at the 6QH level, $200.00 at the 7QH level, $400.00 at the 8QH level, and $800.00 at the 10QH level, while the progressive jackpot is $509.17 at the 9QH level. In FIG. 5, the scalable jackpots are $80.00 at the 5QH level, $200.00 at the 6QH level, $400.00 at the 7QH level, $1200.00 at the 9QH level, and $1600.00 at the 10QH level, while the progressive jackpot is now $509.35 at the 8QH level. In FIG. 6, the scalable jackpots are $120.00 at the 5QH level, $300.00 at the 6QH level, $1200.00 at the 8QH level, $1800.00 at the 9QH level, and $2400.00 at the 10QH level, while the progressive jackpot is now $510.24 at the 7QH level. In FIG. 7, the scalable jackpots are $160.00 at the 5QH level, $800.00 at the 7QH level, $1600.00 at the 8QH level, $2400.00 at the 9QH level, and $3200.00 at the 10QH level, while the progressive jackpot is now $510.78 at the 6QH level. As seen in FIG. 4-7, the displayed jackpots are sorted in descending order with a highest jackpot at the top level (e.g., 10QH) of the ladder 208 and a lowest jackpot at the bottom level (e.g., 5QH) of the ladder 208.

At step 104, the game-logic circuitry detects, via a value input device, a physical item associated with a monetary value that establishes a monetary balance. As shown in FIGS. 4-7, the monetary balance for a selected denomination 210 (e.g., $1) may be shown as credits on a credit meter 200 of the gaming machine.

At step 106, the game-logic circuitry receives, via at least one of one or more electronic input devices, a wager input indicative of a wager drawn from the monetary balance. To initiate a spin of the reels, the player may press a "Spin" or "Max Bet" key on a button panel or touch screen. As shown in FIGS. 4-7, the wager may be shown on a bet meter 202.

At step 108, the game-logic circuitry scales the scalable jackpots, but not the progressive jackpot, according to (e.g., in direct proportion to) an amount of the wager. In the example shown in FIGS. 4-7, the wager ranges from 10 to 40 credits: the wager is 10 credits in FIG. 4, 20 credits in FIG. 5, 30 credits in FIG. 6, and 40 credits in FIG. 7. For the wager of 20 credits in FIG. 5, any scalable jackpots in the ladder 208 are twice (2×) the scalable jackpots at corresponding levels in FIG. 4. For the wager of 30 credits in FIG. 6, any scalable jackpots in the ladder 208 are three times (3×) the scalable jackpots at corresponding levels in FIG. 4. For the wager of 40 credits in FIG. 7, any scalable jackpots in the ladder 208 are four times (4×) the scalable jackpots at corresponding levels in FIG. 4. It should be noted that the scalable jackpot at the 9QH level in FIGS. 5-7 is based on a scalable jackpot value of $600.00 that would appear at the 9QH level in FIG. 4 if that level was not occupied by the progressive jackpot. Unlike the scalable jackpots, the progressive jackpot at the 9QH level in FIG. 4, the 8QH level in FIG. 5, the 7QH level in FIG. 6, and the 6QH level in FIG. 7 does not scale according to the amount of the wager. Rather, as stated above, the progressive jackpot increments each time the wagering game is played but the progressive jackpot is not won.

At step 110, the game-logic circuitry determines whether or not the plurality of jackpots in the ladder would be in descending order after the scalable jackpots are scaled according to an amount of the wager. The reason why the plurality of jackpots in the ladder may not be in descending order is that the scalable jackpots, but not the progressive jackpot, scale with the wager amount. Thus, when the scalable jackpots are scaled upwards in value as the wager amount increases, the progressive jackpot may be too high in the ladder; and when the scalable jackpots are scaled downwards in value as the wager amount decreases, the progressive jackpot may be too low in the ladder. If the jackpots would be in descending order at step 110, the method proceeds to step 114.

If, however, the jackpots would not be in descending order at step 110, the method first proceeds to step 112 where the game-logic circuitry sorts the jackpots into descending order by (i) shifting or migrating the progressive jackpot from its current level to a different level in the ladder where it replaces the scalable jackpot at that different level, and (ii) entering a scaled jackpot at the current level vacated by the progressive jackpot. If the progressive jackpot could be shifted to more than one different level in the ladder to keep the jackpots in descending order, the progressive jackpot is shifted to the most logical level for the wager amount in question and a migration pattern across different wager amounts that the game designer may wish to achieve. If there is more than one progressive jackpot in the ladder, the additional progressive jackpot(s) may likewise need to be migrated in order to keep the jackpots in descending order. The above process may be animated on the presentation assembly by highlighting the levels and/or jackpots involved in the change, using ribbon or streaming effects between the jackpot levels involved in the change, shifting the progressive jackpot up or down the ladder as applicable, and showing the jackpot replacements referenced above using fade-out and face-in graphical effects.

By way of example, FIGS. 4-7 depict four successive wagered plays of the wagering game where the progressive jackpot successively migrates downward to a lower level in the jackpot ladder 208 in order to keep the displayed jackpots in descending order. When the player places a wager of 20 credits in FIG. 5 after previously placing a wager of 10 credits in FIG. 4, the progressive jackpot ($509.17) at the 9QH level in FIG. 4 migrates to the 8QH level in FIG. 5 and is replaced at the 9QH level with a scaled jackpot ($1200.00). When the player places a wager of 30 credits in FIG. 6 after previously placing a wager of 20 credits in FIG. 5, the progressive jackpot (now $509.35) at the 8QH level in FIG. 5 migrates to the 7QH level in FIG. 6 and is replaced at the 8QH level with a scaled jackpot ($1200.00). When the player places a wager of 40 credits in FIG. 7 after previously placing a wager of 30 credits in FIG. 6, the progressive jackpot (now $510.24) at the 7QH level in FIG. 6 migrates to the 6QH level in FIG. 7 and is replaced at the 7QH level with a scaled jackpot ($800.00). By migrating the progressive jackpot down the ladder levels as the wager amount increases, the number of QH symbols required to win the progressive jackpot decreases as the wager amount increases. Thus, the odds of winning the progressive jackpot increases as the wager amount increases. Table 1 below summarizes the migration of the progressive jackpot (PROG) down the ladder levels as the wager amount increases from 10 credits to 40 credits, wherein the value in parentheses after PROG indicates the scaled jackpot that replaces PROG when the PROG vacates that level at a different wager amount:

TABLE 1

| | 10 | 20 | 30 | 40 |
|---|---|---|---|---|
| 10QH | 800 | 1,600 | 2,400 | 3,200 |
| 9QH | PROG (600) | 1,200 | 1,800 | 2,400 |
| 8QH | 400 | PROG (800) | 1,200 | 1,600 |
| 7QH | 200 | 400 | PROG (600) | 800 |
| 6QH | 100 | 200 | 300 | PROG (400) |
| 5QH | 40 | 80 | 120 | 160 |

The method then proceeds to step 114. At step 114, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Each of FIGS. 4-7 depicts a respective outcome of a reel spin.

At step 116, the game-logic circuitry awards standard payouts in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 4, for example, depicts a line pay of three K symbols along a bottom row of the array 206. Although not shown, in addition to jackpot pays at step 122 for collecting 5 or more QH symbols, the game may award a scatter pay for 3 or 4 QH symbols in the array. The awarded pays are added to the win meter 204.

At step 118, the game-logic circuitry determines whether or not the spin outcome includes a jackpot trigger for awarding one of the jackpots in the ladder. In one embodiment, the jackpot trigger is five or more scattered QH symbols in the array. In another embodiment, the jackpot trigger can be achieved in a bonus game triggered during play of the base game. The bonus game may include one or more free spins of the reels. The number of free spins may be a fixed or variable number. In each free spin, the game-logic circuitry spins and stops the reels to randomly land symbols in the array. The bonus game may be a "hold-and-respin" game in which the QH symbols are held or locked in place in the array from one free spin to the next. The hold-and-respin game may commence with an initial number of free spins such as three. The appearance of any additional QH symbols during a free spin may reset the remaining number of free spins to the initial number. The requisite number of QH symbols (e.g., five or more QH symbols) for awarding one of the jackpots may be collected in a single spin or accumulated over multiple spins of the bonus game.

If the spin outcome does not include a jackpot trigger at step 118, the method proceeds to step 122. If, however, the spin outcome includes a jackpot trigger at step 118, the method first proceeds to step 120 where the game-logic circuitry pays the jackpot according to the collected number of QH symbols. FIG. 6, for example, depicts an award of the scaled jackpot, $300.00, at the 6QH level of the ladder 208 in response to the collection of 6 QH symbols in the array 206. It should be noted that if the collected number of QH symbols exceeds 10 QH symbols, the game-logic circuitry may award the jackpot at the 10QH level, may award additional jackpots (not shown) for collecting more than 10 QH symbols, or may bank the extra QH symbols for later use in combination with newly collected QH symbols. The method then proceeds to step 122.

At step 122, the game-logic circuitry determines whether or not it has received a cashout input via at least one of the one or more electronic input devices of the gaming machine. If it has not received a cashout input, the game-logic circuitry waits for the next wager input at step 106. If it has received a cashout input, the game-logic circuitry initiates a payout from the credit balance on the credit meter such as the meter 200 in FIGS. 4-7. The data processing method then ends at step 124.

In an alternative embodiment, instead of shifting the progressive jackpot (PROG) in the ladder 208 in FIGS. 4-7 such that the ladder jackpots are sorted in descending order pursuant to steps 110 and 112 in FIG. 3, the progressive jackpot may be shifted such that the ladder jackpots are sorted into a different target pattern/order. For example, the scaled jackpots in the ladder may be in descending order but the progressive jackpot may be shifted (based on the wager amount) to a jackpot level that is one level above or below a level that would otherwise result in the ladder jackpots being in descending order. For example, at a wager of 10 credits, the jackpots in the ladder could be sorted into the following target pattern: $800 at 10QH level, $600.00 at 9QH level, $400.00 at 8QH level, PROG ($509.17 in FIG. 4) at 7QH level, $100.00 at 6QH level, and $40.00 at 5QH level. Or, the jackpots could be sorted into the following target pattern: PROG ($509.17 in FIG. 4) at 10QH level, $600.00 at 9QH level, $400.00 at 8QH level, $200.00 at 7QH level, $100.00 at 6QH level, and $40.00 at 5QH level.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including game-logic circuitry securely housed within a locked box inside a gaming cabinet, the game-logic circuitry including a central processing unit connected to a main memory, the main memory storing programming for a random number generator (RNG), game-outcome logic, and a trusted authentication code, the method comprising the operations of:

generating, by the game-logic circuitry, a live authentication code;

comparing, by the game-logic circuitry, the live authentication code to the trusted authentication code stored in the main memory;

permitting execution of the RNG programming and the game-outcome logic based on the comparing;

presenting, on a presentation assembly, a plurality of reels, an array, and a ladder, the plurality of reels bearing a plurality of symbols, the ladder including a plurality of levels, the plurality of levels including a top level and a bottom level, the plurality of levels bearing respective jackpots of a plurality of jackpots, the plurality of jackpots including a first set of scalable jackpots and a second set of at least one progressive jackpot, the plurality of jackpots being sorted in descending order with a highest jackpot at the top level of the ladder and a lowest jackpot at the bottom level of the ladder;

detecting, via a value input device, a physical item associated with a monetary value that establishes a monetary balance;

receiving, via at least one of one or more electronic input devices, a wager input indicative of a wager drawn from the monetary balance;

scaling, by the game-logic circuitry, the scalable jackpots, but not the progressive jackpot, according to an amount of the wager;

if the plurality of jackpots would not be in descending order after the scaling, animating, on the presentation assembly, a sorting of the jackpots into descending order by shifting the progressive jackpot from its current level to a different level in the ladder and entering a scaled jackpot at the current level vacated by the progressive jackpot;

animating, on the presentation assembly, one or more spins of the plurality of the reels to land symbols from the plurality of symbols in the array; and receiving, via at least one of the one or more electronic input devices, a cashout input that initiates a payout from the monetary balance.

2. The method of claim 1, wherein the scaling includes scaling the scalable jackpots in proportion to the amount of the wager.

3. The method of claim 1, wherein the progressive jackpot increments as wagers are placed, and wherein the scalable jackpots do not increment as wagers are placed.

4. The method of claim 1, wherein in response to a triggering event, awarding at least one of the jackpots in the ladder.

5. The method of claim 4, wherein the triggering event includes a predetermined number or combination of special symbols within the landed symbols.

6. The method of claim 5, wherein the predetermined number may be accumulated over the one or more spins.

7. The method of claim 1, wherein the gaming machine is regulatorily approved and primarily dedicated to playing a wagering game.

8. A gaming system comprising:

a gaming machine including:

a gaming cabinet;

a value input device configured to detect a physical item associated with a monetary value that establishes a monetary balance;

one or more electronic input devices configured to receive a wager input indicative of a wager drawn from the monetary balance and to receive a cashout input that initiates a payout from the monetary balance; and a presentation assembly configured to present a plurality of reels, an array, and a ladder, the plurality of reels bearing a plurality of symbols, the ladder including a plurality of levels, the plurality of levels including a top level and a bottom level, the plurality of levels bearing respective jackpots of a plurality of jackpots, the plurality of jackpots including a first set of scalable jackpots and a second set of at least one progressive jackpot, the plurality of jackpots being sorted in descending order with a highest jackpot at the top level of the ladder and a lowest jackpot at the bottom level of the ladder; and game-logic circuitry securely housed within a locked box inside the gaming cabinet, the game-logic circuitry including a central processing unit connected to a main memory, the main memory storing programming for a random number generator (RNG), game-outcome logic, and a trusted authentication code, the game-logic circuitry being configured to perform the operations of:

generating a live authentication code;

comparing the live authentication code to the trusted authentication code stored in the main memory;

permitting execution of the RNG programming and the game-outcome logic based on the comparing;

scaling the scalable jackpots, but not the progressive jackpot, according to an amount of the wager;

if the plurality of jackpots would not be in descending order after the scaling, animating, on the presentation assembly, a sorting of the jackpots into descending order by shifting the progressive jackpot from its current level to a different level in the ladder and entering a scaled jackpot at the current level vacated by the progressive jackpot; and animating, on the presentation assembly, one or more spins of the plurality of the reels to land symbols from the plurality of symbols in the array.

9. The system of claim 8, wherein the scaling includes scaling the scalable jackpots in proportion to the amount of the wager.

10. The system of claim 8, wherein the progressive jackpot increments as wagers are placed, and wherein the scalable jackpots do not increment as wagers are placed.

11. The system of claim 8, wherein in response to a triggering event, the game-logic circuitry is configured to perform the operation of awarding at least one of the jackpots in the ladder.

12. The system of claim 11, wherein the triggering event includes a predetermined number or combination of special symbols within the landed symbols.

13. The system of claim 12, wherein the predetermined number may be accumulated over the one or more spins.

14. The system of claim 8, wherein the gaming machine is regulatorily approved and primarily dedicated to playing a wagering game.

15. A regulatorily-approved gaming machine primarily dedicated to playing a wagering game, the machine comprising:

a gaming cabinet;

a value input device configured to detect a physical item associated with a monetary value that establishes a monetary balance;

one or more electronic input devices configured to receive a wager input indicative of a wager drawn from the monetary balance and to receive a cashout input that initiates a payout from the monetary balance;

a presentation assembly configured to present a plurality of reels, an array, and a ladder, the plurality of reels bearing a plurality of symbols, the ladder including a plurality of levels, the plurality of levels including a top level and a bottom level, the plurality of levels bearing respective jackpots of a plurality of jackpots, the plurality of jackpots including a first set of scalable jackpots and a second set of at least one progressive jackpot, the plurality of jackpots being sorted in descending order with a highest jackpot at the top level of the ladder and a lowest jackpot at the bottom level of the ladder; and game-logic circuitry securely housed within a locked box inside the gaming cabinet, the game-logic circuitry including a central processing unit connected to a main memory, the main memory storing programming for a random number generator (RNG), game-outcome logic, and a trusted authentication code, the game-logic circuitry being configured to perform the operations of:

generating a live authentication code;

comparing the live authentication code to the trusted authentication code stored in the main memory;

permitting execution of the RNG programming and the game-outcome logic based on the comparing;

scaling the scalable jackpots, but not the progressive jackpot, according to an amount of the wager;

if the plurality of jackpots would not be in descending order after the scaling, animating, on the presentation assembly, a sorting of the jackpots into descending order by shifting the progressive jackpot from its current level to a different level in the ladder and entering a scaled jackpot at the current level vacated by the progressive jackpot; and animating, on the presentation assembly, one or more spins of the plurality of the reels to land symbols from the plurality of symbols in the array.

16. The machine of claim 15, wherein the scaling includes scaling the scalable jackpots in proportion to the amount of the wager.

17. The machine of claim 15, wherein the progressive jackpot increments as wagers are placed, and wherein the scalable jackpots do not increment as wagers are placed.

18. The machine of claim 15, wherein in response to a triggering event, the game-logic circuitry is configured to perform the operation of awarding at least one of the jackpots in the ladder.

19. The machine of claim 18, wherein the triggering event includes a predetermined number or combination of special symbols within the landed symbols.

20. The machine of claim 19, wherein the predetermined number may be accumulated over the one or more spins.

* * * * *